(12) United States Patent
Gemert et al.

(10) Patent No.: US 7,368,072 B2
(45) Date of Patent: May 6, 2008

(54) PHOTOCHROMIC CONTACT LENSES AND METHODS OF MANUFACTURING

(75) Inventors: Barry Van Gemert, Murrysville, PA (US); Anil Kumar, Pittsburgh, PA (US); Frank P. Mallak, Export, PA (US); Robert W. Walters, Export, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 901 days.

(21) Appl. No.: 10/315,656

(22) Filed: Dec. 10, 2002

(65) Prior Publication Data

US 2003/0142267 A1 Jul. 31, 2003

Related U.S. Application Data

(60) Provisional application No. 60/340,047, filed on Dec. 10, 2001.

(51) Int. Cl.
*B29D 11/00* (2006.01)
*G02B 3/00* (2006.01)
*G02B 1/00* (2006.01)

(52) U.S. Cl. .................. 264/1.7; 264/1.32; 264/1.8; 264/1.9

(58) Field of Classification Search ........... 264/1.32, 264/1.8, 1.9, 1.7
See application file for complete search history.

(56) References Cited

U.S. PATENT DOCUMENTS

| | | | |
|---|---|---|---|
| 3,361,706 A | 1/1968 | Smith et al. ............. 260/39 |
| 4,121,885 A | 10/1978 | Erickson et al. ......... 351/177 |
| 4,193,671 A | 3/1980 | Erickson et al. ....... 351/160 H |
| 4,681,412 A * | 7/1987 | Lemelson .............. 351/162 |
| 4,782,946 A * | 11/1988 | Pollak ................. 206/223 |
| 4,931,220 A | 6/1990 | Haynes et al. .......... 252/586 |
| 5,061,279 A | 10/1991 | Friel ....................... 623/4 |
| 5,108,427 A | 4/1992 | Majercik et al. ........ 623/4.5 |
| 5,166,345 A | 11/1992 | Akashi et al. ........... 544/71 |
| 5,236,958 A | 8/1993 | Miyashita .............. 518/121 |
| 5,252,742 A | 10/1993 | Miyashita .............. 548/121 |
| 5,359,085 A | 10/1994 | Iwamoto et al. ........ 548/468 |
| 5,488,119 A | 1/1996 | Fischer-Reimann et al. ................... 552/201 |
| 5,531,940 A * | 7/1996 | Gupta et al. ............. 264/1.7 |
| 5,645,767 A | 7/1997 | Van Gemert ............ 252/586 |
| 5,658,501 A | 8/1997 | Kumar et al. ........... 252/586 |
| 5,821,287 A | 10/1998 | Hu et al. ................. 524/89 |
| 6,017,121 A | 1/2000 | Chateau et al. ......... 351/161 |
| 6,068,797 A * | 5/2000 | Hunt ..................... 264/1.7 |
| 6,113,814 A | 9/2000 | Gemert et al. .......... 252/586 |
| 6,153,126 A | 11/2000 | Kumar ................... 252/586 |
| 6,174,464 B1 | 1/2001 | Garrity .................. 252/586 |
| 6,224,210 B1 | 5/2001 | Chateau et al. ......... 351/164 |
| 6,224,945 B1 | 5/2001 | Calderara .............. 427/353 |
| 6,296,785 B1 | 10/2001 | Nelson et al. ........... 252/586 |
| 6,305,801 B1 | 10/2001 | Kerns, Jr. et al. ........ 351/162 |
| 6,348,604 B1 | 2/2002 | Nelson et al. ........... 549/389 |
| 6,353,102 B1 | 3/2002 | Kumar .................... 544/60 |
| 6,555,028 B2 * | 4/2003 | Walters et al. .......... 252/586 |

FOREIGN PATENT DOCUMENTS

| | | |
|---|---|---|
| GB | 2 305 256 A | 4/1997 |
| GB | 2 365 993 A | 2/2002 |
| WO | 97/05213 | 2/1997 |
| WO | 01/30866 A1 | 5/2001 |

* cited by examiner

*Primary Examiner*—Christina Johnson
*Assistant Examiner*—Matthew J. Daniels
(74) *Attorney, Agent, or Firm*—Deborah M. Altman; Linda Pingitore; Frank P. Mallak

(57) ABSTRACT

Described are contact lenses having photochromic materials within the central or pupillary area of the lens and methods for manufacturing such lenses. In one method, a photochromic amount of at least one photochromic material is added to the pupillary region of a casting mold containing a polymerizable monomer that can be at least partially cured before and/or after the addition. Another method involves providing an amount of polymerizable photochromic monomer for the pupillary region and an amount of polymerizable non-photochromic monomer for the remainder of the contact lens in a casting mold. The photochromic and non-photochromic monomers can differ by their degree of polymerization, viscosity and/or density.

13 Claims, No Drawings

PHOTOCHROMIC CONTACT LENSES AND METHODS OF MANUFACTURING

CROSS REFERENCE TO A RELATED APPLICATION

This application claims priority to provisional application Ser. No. 60/340,047 filed on Dec. 10, 2001.

BACKGROUND OF THE INVENTION

The present invention relates to light sensitive photochromic contact lenses and methods for manufacturing. More particularly, the invention relates to contact lenses having light sensitive substances such as photochromic materials located within the central portion or pupillary region of the lens. The methods for manufacturing are applicable, in one non-limiting embodiment, to the cast molding method of producing contact lenses.

Photochromism is a phenomenon involving a light induced reversible change in color. An article containing such a material that becomes colored upon exposure to light radiation containing ultraviolet rays will revert to the original color when the influence of the ultraviolet radiation is discontinued. Sources of light radiation that contain ultraviolet rays include, for example, sunlight and the light of a mercury lamp. Discontinuation of the ultraviolet radiation can be achieved for example by storing the photochromic material or article in the dark or by removing the source of ultraviolet radiation (e.g., by means of filtering).

Photochromic contact lenses pose a unique set of challenges. The surface of the eye is a challenging environment for contact lenses containing photochromic molecules that typically experience diminished performance at temperatures above 70° F. (21° C.). The contact lens material, typically composed of 50% or more of water, is marginally compatible with what are typically very highly lyophilic molecules. Also, the eye is strongly shaded from the ultraviolet light required for activation of photochromic molecules by the brow and eyelashes.

Although methods for incorporating photochromic materials into contact lenses have been disclosed, a need remains for a fast reliable method of manufacturing photochromic contact lenses wherein the light sensitive substance is located within the central portion or pupillary region of the lens. Moreover there is a need for this process to be economical and readily adaptable to very automated equipment used today to manufacture contact lenses, e.g., hydrophilic cross-linked contact lenses.

DETAILED DESCRIPTION OF THE INVENTION

It has now been discovered that by novel and heretofore unrealized modifications to existing cast molding processes, in one non-limiting embodiment, contact lenses with central region or pupillary region photochromic activity can be prepared. The pupillary region of the eye is the area of the eye in which the opening of the pupil and the typically pigmented iris which serves as a diaphragm controlling the opening and closing of the pupil are located. The pupillary region of a contact lens or casting mold is defined herein as the area of the contact lens or casting mold that corresponds to the pupillary region of the eye and up to 50 percent of the area of the remaining contact lens. The portion of the contact lens beyond that corresponding to the pupillary region of the eye is referred to herein as the lens body.

In one non-limiting embodiment, the region of photochromic activity covers the pupil-only region. In another non-limiting embodiment, the region of photochromic activity covers the area corresponding to the pupil and iris region of the eye. In a further non-limiting embodiment, the region of photochromic activity covers the pupillary region defined hereinbefore. In alternate non-limiting embodiments, the extent of photochromic activity in the contact lens body is less than 50 percent of the lens body area, less than 30 percent, or is 10 percent or less. The percent area is based on the total area of the lens body excluding that which corresponds to the pupillary region of the eye.

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and other parameters used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The phrase "at least partially" preceding the terms "filling hydrating, extracting, replacing or eliminating" means that the extent of filling, hydrating, extracting, replacing or eliminating ranges from a partial to a complete amount of what could be filled, hydrated, extracted, replaced or eliminated. The phrases "at least partially curing a polymerizable composition" or "an at least partially cured polymerizable composition" refer to a polymerizable composition in which the curable or cross-linkable components are at least partially cured, crosslinked and/or reacted. In one non-limiting embodiment of the present invention, the degree of cured, crosslinked or reacted components can vary widely, e.g., from 5% to 90% of all of the possible curable, crosslinkable and/or reactable components.

The phrase "at least essentially cured" refers to a polymerizable composition in which the degree of reacted components ranges from greater than 90% to 100% of all of the possible curable, crosslinkable and/or reactable components. Determination of the degree of reacted components can be accomplished, in one non-limiting embodiment by an extraction process with a solvent, e.g., methanol, that can extract the monomers, other unreacted materials and impurities. The degree of (meth)acrylic, e.g., acrylic and methacrylic, group reaction can be determined using infrared spectroscopic methods known to those skilled in the art.

In one non-limiting embodiment, a method for producing a contact lens comprising a photochromic pupillary region comprises:

a) adding a volume of a first polymerizable monomer composition comprising a first viscosity and a photochromic amount of at least one photochromic material to a concave member of a casting mold comprising a concave member having a pupillary region and a convex member, said volume being sufficient to produce a photochromic pupillary region in an at least essentially cured contact lens;

b) adding a volume of a second polymerizable monomer composition comprising a viscosity at least 300 centipoises less than said first polymerizable monomer composition to the concave member of the casting mold of a), the total volume of the first and second polymerizable monomer composition being sufficient to produce an at least essentially cured contact lens;

c) affixing the convex member to the concave member of the casting mold of b); and d) at least essentially curing the polymerizable composition in the casting mold of c).

In one non-limiting embodiment, the viscosity of the first polymerizable monomer is at least 500 centipoises higher than that of the second polymerizable monomer. In another non-limiting embodiment, the viscosity of the first is at least 1000 centipoises higher than that of the second polymerizable monomer. The viscosity of the first monomer relative to the amount higher it is than the viscosity of the second monomer can range between any of these values, inclusive of the aforementioned values, e.g., at least 350 centipoises higher. The viscosity of the monomers is determined by a Brookfield Viscometer.

In another non-limiting embodiment, the method for producing a contact lens comprising a photochromic pupillary region further comprises at least partially curing the first and/or second polymerizable monomer composition:

a) prior to adding it to the concave member of the casting mold;

b) after adding it to the concave member of the casting mold; or c) a combination thereof.

In a further non-limiting embodiment, the method for producing a contact lens comprising a photochromic pupillary region further comprises removing the at least essentially cured contact lens from the casting mold.

In a still further non-limiting embodiment, the method for producing a contact lens comprising a photochromic pupillary region further comprises:

a) at least partially hydrating the at least essentially cured contact lens;

b) at least partially extracting any unreacted monomer or impurities from the contact lens of a);

c) at least partially replacing the residual liquid remaining from a) and b) in the contact lens with an isotonic salt solution; and d) at least partially eliminating the microbial content from the contact lens of c) and packaging it; or e) packaging the contact lens of c) and at least partially eliminating the microbial content.

In one non-limiting embodiment, polymerization of the polymerizable composition of the present invention can occur by mechanisms described in the definition of "polymerization" in *Hawley's Condensed Chemical Dictionary* Thirteenth Edition, 1997, John Wiley & Sons, pages 901-902. Those mechanisms include by "addition", in which free radicals are the initiating agents that react with the double bond of the monomer by adding to it on one side at the same time producing a new free electron on the other side or by "condensation", involving the splitting out of water molecules by two reacting monomers.

In another non-limiting embodiment, polymerization of the polymerizable monomers can be accomplished by adding to the polymerizable monomer compositions an initiating amount of material capable of generating free radicals, such as organic peroxy compounds or azobis(organonitrile) compounds, e.g., a polymerization initiator. Methods for polymerizing monomer compositions are well known to the skilled artisan and any of those well known techniques can be used to polymerize the aforedescribed polymerizable compositions. Such polymerization methods include thermal polymerization, photopolymerization or a combination thereof.

Non-limiting examples of organic peroxy compounds, that can be used as thermal polymerization initiators include: peroxymonocarbonate esters, such as tertiarybutylperoxy isopropyl carbonate; peroxydicarbonate esters, such as di(2-ethylhexyl)peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. In one non-limiting embodiment the thermal initiators used are those that do not discolor the resulting polymerizate.

Non-limiting examples of azobis(organonitrile) compounds, that can be used as thermal polymerization initiators include: azobis(isobutyronitrile), azobis(2,4-dimethylvaleronitrile) or a mixture thereof.

The amount of thermal polymerization initiator used to initiate and polymerize the polymerizable monomer compositions can vary and will depend on the particular initiator used. In one non-limiting embodiment, only that amount that is required to initiate and sustain the polymerization reaction is required, e.g., an initiating amount. With respect to the peroxy compound, diisopropyl peroxydicarbonate, used in one non-limiting embodiment, the amount is typically between 0.01 and 3.0 parts of that initiator per 100 parts of the polymerizable organic composition (phm). In another non-limiting embodiment, between 0.05 and 1.0 phm is used to initiate the polymerization. The thermal cure cycle involves heating the polymerizable monomer composition in the presence of the initiator, in one non-limiting embodiment, from room temperature to 85° C. to 125° C. over a period of from 30 minutes to 30 hours.

In one non-limiting embodiment, photopolymerization of the polymerizable monomer compositions according to the present invention can be carried out in the presence of a photopolymerization initiator using ultraviolet light, visible light, or a combination thereof. Non-limiting examples of photopolymerization initiators include benzoin, benzoin methyl ether, benzoin isobutyl ether benzophenol, acetophenone, 4,4'-dichlorobenzophenone, diethoxyacetophenone, 2-hydroxy-2-methyl-1-phenylpropan-1-one, 1-hydroxycyclohexyl phenyl ketone, 2-isopropylthixantone and 2,4,6-trimethylbenzoyldiphenylphospine oxide. The amount of photopolymerization initiator used to initiate and polymerize the polymerizable monomer compositions can vary and will depend on the particular initiator used. Only that amount that is required to initiate and sustain the polymerization reaction is required, e.g., an initiating amount. In one non-limiting embodiment, the photopolymerization initiator is used in an amount from 0.01 percent to 5 percent by weight, based on the weight of monomer components.

In one non-limiting embodiment, the light source used for the photopolymerization is chosen from those which emit ultraviolet light. The light source can be a mercury lamp, a germicidal lamp or a xenon lamp. Visible light, e.g., sunlight, can also be used. The exposure time may differ depending upon, e.g., the wavelength and intensity of the light source and the particular photochromic article, and is typically determined empirically.

In another non-limiting embodiment, various conventional additives can be incorporated into the polymerizable monomer compositions of the present invention. Such additives can include light stabilizers, heat stabilizers, antioxidants, ultraviolet light absorbers, mold release agents, static (non-photochromic) dyes, pigments, solvents and polymerization inhibitors to promote stability during storage, and ultraviolet light absorbers (other than the photochromic compounds). Antiyellowing additives, e.g., 3-methyl-2-butenol, organo pyrocarbonates and triphenyl phosphite [CAS 101-02-0], can also be added to polymerizable monomer compositions of the present invention to enhance resistance to yellowing.

In a further non-limiting embodiment, it is also contemplated that a polymerization moderator, or a mixture thereof polymerization moderators, can be added to the polymerizable composition of the present invention to minimize the formation of distortions, such as striations, in polymerizates obtained therefrom. Non-limiting examples of polymerization moderators include: dilauryl thiodipropionate, terpinolene, 1-isopropyl-4-methyl-1,4-cyclohexadiene, 1-isopropyl-4-methyl-1,3-cyclohexadiene, 1,3-diisopropenylbenzene, alpha-methyl styrene, 2,4-diphenyl-4-methyl-1-pentene, 1,1-diphenylethylene, cis-1,2-diphenylethylene, 2,6-dimethyl-2,4,6-octatriene, 4-tertbutylpyrocatechol, 3-methyl-2-butenol or a mixture thereof.

In a still further non-limiting embodiment, the polymerization moderator can be added to the polymerizable monomer compositions in an amount from 0.01 percent to 20 percent by weight, e.g., from 0.1 percent to 10 percent by weight or from 0.3 percent to 5 percent by weight, based on the total weight of the polymerizable composition. The amount of polymerization moderator can range between any combination of these values, inclusive of the recited ranges, e.g. from 0.015 to 19.999 weight percent.

In one non-limiting embodiment, the polymerizate or contact lens obtained from polymerization of polymerizable monomer compositions are solid, flexible and transparent or optically clear so that they can be used as optical elements, e.g., optical contact lenses.

In another non-limiting embodiment, the photochromic material can be dispensed into the pupillary region of the polymerizable monomer composition in an at least partially filled contact lens mold that is filled with a sufficient amount to produce a pupillary region in an at least essentially cured contact lens, by addition, e.g., injection. This can be done after the process of at least partially curing the polymerizable monomers, during the process of at least partially curing the polymerizable monomers or a combination thereof.

In a further non-limiting embodiment, the polymerizable monomers used to cast the contact lens can be divided into at least two different casting mold additions. At least one photochromic material can be added to at least one casting mold addition to produce a polymerizable photochromic monomer composition. In one non-limiting embodiment, a predetermined amount, e.g., a volume sufficient to produce a photochromic pupillary region in an at least essentially cured contact lens, of polymerizable photochromic monomer composition, that can be at least partially polymerized, can be dispensed into the concave member of a casting mold comprising a concave member having a pupillary region and a convex member, before the addition of the polymerizable non-photochromic monomer composition, after the addition of the polymerizable non-photochromic monomer composition or by a combination thereof.

In another non-limiting embodiment, the polymerizable photochromic monomer composition can be at least partially cured after adding or dispensing it into the mold, thereby limiting the occurrence of mixing with the non-photochromic monomer which would be included to produce the remainder of the contact lens.

In the cast molding process, a contact lens is generally or typically formed between two steel, brass, or (more typically) plastic molds. The molds are designed with precise anterior and posterior surface geometry. During the molding process, in one non-limiting embodiment, monomer is dispensed into the concave member of the casting mold, followed by press-fitting the convex member, leaving the monomer sandwiched between the optical surfaces of the casting mold. Depending on the casting molds used, in one non-limiting embodiment, a gasket that sets the thickness of the polymerizate or contact lens can be used. The use of a gasket, if necessary, is included in the step of affixing the convex member of the casting mold to the concave member. The monomer can then be cured to create a lens via exposure to actinic radiation, e.g., ultraviolet light, a thermal process or a combination of the two curing processes.

After an essentially cured lens is formed, in one non-limiting embodiment, it is removed from the mold and undergoes at least a partial hydration and at least a partial extraction process. During these steps, the amount of water that a lens can absorb varies widely. In one non-limiting embodiment, the lens can absorb from 38% to 72% of its weight in water. After the hydration process, in one non-limiting embodiment, the lens can be extracted or rinsed with solvent. The type of solvent that can be used varies widely and depends on the material to be removed. In one non-limiting embodiment, it can be an organic solvent, such as methanol, or water, e.g., purified water having a minimized microbial level. The extraction process is done to remove any unreacted monomer and/or impurities. These processes can be run simultaneously, e.g., in a heated water bath, or sequentially.

After the hydration and extraction processes, in one non-limiting embodiment, the lens is immersed or contacted with an isotonic salt solution, such as physiological saline that can optionally be buffered. This step is intended, in one non-limiting embodiment, to replace the residual liquid remaining from the hydration and extraction steps with a salt solution that is tolerated by the eye. In another non-limiting embodiment, the resulting contact lens product can be sterilized in which the microbial content is at least partially eliminated and the resulting contact lens is packaged. In an alternate non-limiting embodiment, the contact lens can be packaged and the contents of the package can be sterilized, depending on the manufacturing process used.

In the process of the present invention, the mixture of monomers used to cast the contact lens, in one non-limiting embodiment, includes hydroxyethyl methacrylate, N-vinyl pyrrolidone, methacrylic acid, methyl methacrylate, styrene, alpha-methylstyrene, vinyltoluene, p-chlorostyrene, o-chlorostyrene, p-bromostyrene, o-bromostyrene, divinylbenzene, divinylbiphenyl, vinyl acetate, vinyl propionate, vinyl benzoate, ethyl(meth)acrylate, isopropyl(meth)acrylate, allyl(meth)acrylate, phenyl(meth)acrylate, benzyl (meth) acrylate, p-chlorophenyl(meth)acrylate, p-chlorobenzyl (meth)acrylate, pbromophenyl(meth)acrylate, p-bromobenzyl (meth)acrylate, naphthyl(meth)acrylate, (meth)acrylamide, N,N-dimethyl(meth)acrylamide, N,N-diethyl(meth) acrylamide, 2-hydroxy-3-phenoxyopropyl(meth)acrylate, ethylene glycol di(meth)acrylate, diethylene glycol di(meth) acrylate, polyethylene glycol di(meth)acrylate, propylene glycol di(meth)acrylate, dipropylene glycol di(meth)acrylate, polypropylene glycol di(meth)acrylate, glycerol di(meth)acrylate, 3-acryloyloxyglycerol monomethacrylate, trimethylolpropane tri(meth)acrylate, pentaerythritol tetra (meth)acrylate, 2,2-bis(4-(meth) acryloyloxy(2'-hydroxypropyloxy)phenyl)propane, diisopropyl fumarate, diisopropyl maleate, dibenzyl fumarate, dibenzyl maleate, dibenzyl mesaconate, maleic anhydride, and itaconic anhydride. These monomers may be used alone or in a mixture thereof.

In one non-limiting embodiment, styrene and p-chlorostyrene can be included to improve the refractive index of the resin material obtained by curing the resin composition, resulting in a further reduction in specific gravity. In another non-limiting embodiment, a cross-linking monomer such as ethylene glycol dimethacrylate or diethylene glycol dimethacrylate or combinations thereof can be used.

In a further non-limiting embodiment, a first monomer having a viscosity at least 300 centipoise higher than the second monomer can also have a greater density than the second monomer. According to *Hawley's Condensed Chemical Dictionary* Thirteenth Edition, 1997, John Wiley & Sons, pages 1038-1039, the definition of specific gravity states that the density of solids and liquids is numerically equal to the specific gravity. Photochromic material added to such a first monomer, used in the process of the present invention would result in a contact lens comprising a non-photochromic polymeric lens body and a photochromic pupillary region, located within the lens body, the photochromic pupillary region having a greater density than the non-photochromic lens body.

A photochromic amount of at least one photochromic material, in one non-limiting embodiment, can be added to the pupillary region of an at least partially filled concave member of a casting mold. This can be accomplished, in one non-limiting embodiment, by injecting the photochromic materials beneath the surface of the polymerizable monomer into the pupillary region of the concave member. The polymerizable composition can be at least partially polymerized prior to the addition of photochromic materials, during the addition of photochromic materials, after the addition of photochromic materials or by a combination thereof.

As used herein and in the claims, by "photochromic amount" is meant an amount of photochromic material that is at least sufficient to produce a photochromic effect discernible to the naked eye upon activation. The particular amount used depends often upon the thickness of the contact lens, size of the pupillary region and the intensity of color desired upon irradiation thereof. Typically, the more photochromic material incorporated, the greater the color intensity is up to a certain limit. There is a point after which the addition of any more material will not have a noticeable effect.

The amount of photochromic material incorporated into the polymerizable composition can vary widely. In one non-limiting embodiment, the amount ranges from 0.01 to 40 weight percent based on the weight of the polymerizable composition. For example, the concentration of photochromic material can range from 0.05 to 30 weight percent, or from 0.1 to 20 weight percent or from 0.2 to 15 weight percent, e.g., from 7 to 14 weight percent, based on the weight of the polymerizable composition. The concentration of photochromic material can range between any combination of these values, inclusive of the recited ranges, e.g., from 0.05 to 39.95 weight percent.

The photochromic materials used in the process of the present invention may be used alone or in combination with one or more other appropriate and complementary photochromic materials, e.g., organic photochromic compounds having at least one activated absorption maxima within the range of 400 and 700 nanometers, and which color when activated to an appropriate hue. Further discussion of neutral colors and ways to describe colors can be found in U.S. Pat. No. 5,645,767, column 12, line 66 to column 13, line 19.

In one non-limiting embodiment, polymerizable photochromic materials, such as polymerizable naphthoxazines disclosed in U.S. Pat. No. 5,166,345 at column 3, line 36 to column 14, line 3; polymerizable spirobenzopyrans disclosed in U.S. Pat. No. 5,236,958 at column 1, line 45 to column 6, line 65; polymerizable spirobenzopyrans and spirobenzothiopyrans disclosed in U.S. Pat. No. 5,252,742 at column 1, line 45 to column 6, line 65; polymerizable fulgides disclosed in U.S. Pat. No. 5,359,085 at column 5, line 25 to column 19, line 55; polymerizable naphthacenediones disclosed in U.S. Pat. No. 5,488,119 at column 1, line 29 to column 7, line 65; polymerizable spirooxazines disclosed in U.S. Pat. No. 5,821,287 at column 3, line 5 to column 11, line 39; polymerizable polyalkoxylated naphthopyrans disclosed in U.S. Pat. No. 6,113,814 at column 2, line 23 to column 23, line 29; and the polymerizable photochromic compounds disclosed in WO97/05213 and application Ser. No. 09/828,260 filed Apr. 6, 2001 can be used.

In a further non-limiting embodiment, the photochromic materials can include the following classes of materials: chromenes, e.g., naphthopyrans, benzopyrans, indenonaphthopyrans and phenanthropyrans; spiropyrans, e.g., spiro (benzindoline)naphthopyrans, spiro(indoline)benzopyrans, spiro(indoline)naphthopyrans, spiro(indoline)quinopyrans and spiro(indoline)pyrans; oxazines, e.g., spiro(indoline) naphthoxazines, spiro(indoline)pyridobenzoxazines, spiro (benzindoline)pyridobenzoxazines, spiro(benzindoline) naphthoxazines and spiro(indoline)benzoxazines; mercury dithizonates, fulgides, fulgimides and mixtures of such photochromic compounds. Such photochromic compounds and complementary photochromic compounds are described in U.S. Pat. No. 4,931,220 at column 8, line 52 to column 22, line 40; U.S. Pat. No. 5,645,767 at column 1, line 10 to column 12, line 57; U.S. Pat. No. 5,658,501 at column 1, line 64 to column 13, line 17; U.S. Pat. No. 6,153,126 at column 2, line 18 to column 8, line 60; U.S. Pat. No. 6,296,785 at column 2, line 47 to column 31, line 5; U.S. Pat. No. 6,348,604 at column 3, line 26 to column 17, line 15; and U.S. Pat. No. 6,353,102 at column 1, line 62 to column 11, line 64. Spiro(indoline)pyrans are also described in the text, *Techniques in Chemistry*, Volume III, "Photochromism", Chapter 3, Glenn H. Brown, Editor, John Wiley and Sons, Inc., New York, 1971.

In another non-limiting embodiment, other photochromic materials, that can be used include organo-metal dithiozonates, i.e., (arylazo)-thioformic arylhydrazidates, e.g., mercury dithizonates which are described in, for example, U.S. Pat. No. 3,361,706 at column 2, line 27 to column 8, line 43; and fulgides and fulgimides, e.g., the 3-furyl and 3-thienyl fulgides and fulgimides, which are described in U.S. Pat. No. 4,931,220 at column 1, line 39 through column 22, line 41.

The disclosures relating to such photochromic compounds in the aforedescribed patents, indicated by column and line number, are incorporated herein by reference.

In one non-limiting embodiment, the process of the present invention utilizes a means to carry out separate additions to the concave member of the casting mold. For example, two high precision valves and controllers can be included in the standard mold casting equipment for addition of the polymerizable monomer and the photochromic amount of at least one photochromic material or for the addition of the two different polymerizable monomer compositions, e.g., one photochromic and the other non-photochromic. In another non-limiting embodiment, a dispensing means that adds material in a non-disruptive or non-turbulent fashion so as to avoid mixing or disturbing the material already in the mold, can be used. Such equipment is frequently used in the electronics and medical device industries. A non-limiting example of such equipment includes the 740MD-SS micro dot needle valve and Valvemate® 7000 controller available from the EFD Corporation, East Providence, R.I., 02914.

In another non-limiting embodiment, the needle valve and controller used to add the photochromic containing compositions have a high degree of precision, not only volumetrically but also positionally, e.g., when adding to the pupillary region of the at least partially filled casting mold. Positional precision will also be a function of the degree of control of the dispense tip that has been selected. The needle valve and controller adding the non-photochromic monomer, in one non-limiting embodiment, can be less precise volumetrically as this material will normally be added in excess.

In one non-limiting embodiment of the present invention, photochromic monomer can be first dispensed into the concave (female) member of the casting mold via a precision dispense tip. Although this amount will vary with lens design and correction, typically a volume on the order of 2 to 6 microliters can be dispensed. In another non-limiting embodiment, the monomer is precisely placed in the center of the concave member. The volume dispensed depends on the lens design and power but can be determined based on the volume of the central pupillary area of the finished contact lens. Allowance in the calculation needs to be made for shrinkage that occurs during polymerization and swelling that occurs during hydration. In a further non-limiting embodiment, the diameter of the pupillary region can vary widely depending on the contact lens design and/or focusing power of the lens. In one non-limiting embodiment, it ranges from five to fifteen millimeters (mm), from six to ten mm, e.g., 8 mm. The diameter of the pupillary region can range between any combination of these values, inclusive of the recited ranges.

In another non-limiting embodiment, the polymerizable non-photochromic monomer composition, typically or more microliters, can be dispensed in excess on top of or around the polymerizable photochromic monomer composition taking care not to disturb the central pool of photochromic monomer using the aforementioned dispensing means. In one non-limiting embodiment, some mixing can occur due to, for example, simple Brownian motion. This can produce a lens that does not have a distinct boundary between clear and photochromic sections but rather a mixing or blending of these sections. In some instances this can have a desirable cosmetic effect. In one non-limiting embodiment, half of the non-pupillary region of the lens remains non-photochromic.

In one non-limiting embodiment, the degree of mixing or blending of the photochromic and non-photochromic sections can be controlled by varying the time until either or both monomer compositions is at least partially or essentially cured. If less blending is desired, in one non-limiting embodiment, rapid curing can be most effective in maintaining separate zones. Where some blending is desirable, a slower curing process can be employed. Of course it is also possible to use a combination of cure methods to achieve the desired effect.

In cases where a clear demarcation is desired between photochromic and non-photochromic zones, in one non-limiting embodiment, it can be accomplished by at least partially curing, one or both of the monomer mixtures, before addition to the concave member of the casting mold, after addition to or a combination thereof. In another non-limiting embodiment, viscosity differences can be used to limit blending of the two different monomers compositions. If the photochromic monomer composition is at least partially cured, in one non-limiting embodiment, it can be more viscous and not tend to flow as readily towards the edges during press-fitting of the convex (male) mold member. By using materials of different viscosities, it is less likely that they will blend together prior to polymerization. Also, by using as photochromic monomer materials having a higher viscosity and higher density than the non-photochromic monomers, a contact lens having a photochromic pupillary region of higher density than the non-photochromic lens body can be made. As previously mentioned, the specific gravity of a liquid is numerically equal to the density. Such information about monomers is typically provided by manufacturers in their product catalog, e.g., see the Sartomer Product Catalog.

In an alternate non-limiting embodiment, the viscosity of a monomer can be reduced by the addition of less viscous materials, such as other monomers having a lower relative viscosity or solvents. The addition of a small volume of solvent to the polymerizable monomer composition, in one non-limiting embodiment, can reduce the viscosity during pumping or dispensing. Once the monomer is dispensed into the concave member of the casting mold, in one non-limiting embodiment, the solvent could be removed in all or part, by purging with a stream of nitrogen or other inert gas, prior to a subsequent addition of photochromic material and/or more polymerizable monomer composition. In one non-limiting embodiment, a solvent can be added to the polymerizable non-photochromic monomer composition to decrease its viscosity relative to the polymerizable photochromic monomer composition. Doing so can increase the ability of the polymerizable non-photochromic monomer composition to pool to the outside of the central, more viscous, photochromic monomer in the concave member of the casting mold.

Non-limiting examples of solvents include: benzene, toluene, methyl ethyl ketone, methyl isobutyl ketone, acetone, ethanol, tetrahydrofurfuryl alcohol, propyl alcohol, propylene carbonate, N-methyl pyrrolidinone, N-vinyl pyrrolidinone, N-acetyl pyrrolidinone, N-hydroxymethyl pyrrolidinone, N-butyl pyrrolidinone, N-ethyl pyrrolidinone, N-(N-octyl) pyrrolidinone, N-(N-dodecyl) pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl formamide, ethylene glycol, mono- and dialkyl ethers of ethylene glycol and their derivatives, which are sold as CELLOSOLVE industrial solvents by Union Carbide, and mixtures of such solvents.

In another non-limiting embodiment, in the process of affixing the convex member to the concave member of the casting mold, the less viscous non-photochromic monomer can flow more readily and result in a final lens product having a non-pupillary region that is non-photochromic. After the lens is essentially cured, it can be removed from the mold. Subsequently, the processes traditionally used in the contact lens fabrication such as hydration, extraction or rinsing, sterilization and packaging, will remain unchanged from that known in the art.

In a further non-limiting embodiment, the aforementioned methods of the present invention are used to produce the contact lenses of the present invention.

The present invention is more particularly described in the following example, which is intended as illustrative only, since numerous modifications and variations therein will be apparent to those skilled in the art.

EXAMPLE

Part A

To the concave half of a crown glass casting mold having a 6 base curvature was added 4 drops of SR 9036 (reported to be a Bisphenol A 30 ethoxylated dimethacrylate from Sartomer) and 2 drops of SR 348 monomer (reported to be a Bisphenol A 2 ethoxylated dimethacrylate from Sartomer) containing approximately 2 weight percent, based on the weight of the monomer, of a photochromic naphthopyran that exhibits a blue color when irradiated with ultraviolet light, and 0.5 weight percent, based on the weight of the monomer, of Irgacure 819 (reported to be a phosphine based initiator available from Ciba Geigy).

Part B

The concave half of the crown glass mold of Part A was fitted with a gasket of about 1 millimeter thickness and the corresponding convex half of the crown glass mold was applied with slight pressure to form a complete casting mold. The polymerizable composition in the completed casting mold was cured by exposure to ultraviolet radiation by exposing it on one pass at a speed of 5.0 feet per minute (152.4 cm per minute) on a conveyor belt, beneath two ultraviolet type "D" lamps of 10 inch (25.4 cm) length. The first lamp was maintained at a height of 2.5 inches (6.4 cm) above the conveyor and the second lamp at 6.5 inches (16.5 cm) above the conveyor. The curing system was obtained from Eye Ultraviolet system and had been inerted with nitrogen to a level of less than 100 parts per million of oxygen.

Part C

The casting mold was separated and a lens having an outside diameter of about 1 inch or 2.54 cm, a clear lens body and a colored pupillary region of about 0.44 inch or 1.11 cm was recovered. The lens was exposed to ultraviolet radiation and the pupillary region became darker and after the ultraviolet radiation was discontinued, the pupillary region became less dark.

While the present invention has been described with respect to particular embodiments of apparatus and methods, it will be appreciated that various modifications and adaptations may be made based on the present disclosure and are intended to be within the scope of the accompanying claims.

We claim:

1. A method for producing a contact lens comprising a photochromic pupillary region comprising:
    a) adding a volume of a first polymerizable monomer composition comprising a first viscosity and a photochromic amount of at least one photochromic material to a concave member of a casting mold comprising a concave member having a pupillary region and a convex member, said volume being sufficient to produce a photochromic pupillary region in an at least essentially cured contact lens;
    b) adding a volume of a second polymerizable monomer composition comprising a viscosity at least 300 centipoise less than said first polymerizable monomer composition to the concave member of the casting mold, the total volume of the first and second polymerizable monomer composition being sufficient to produce an at least essentially cured contact lens;
    c) affixing the convex member to the concave member of the casting mold; and
    d) at least essentially curing the polymerizable composition in the casting mold; wherein the extent of photochromic activity in the contact lens body is less than 50 percent of the lens body area.

2. The method of claim 1 further comprising at least partially curing the first polymerizable monomer composition:
    a) prior to adding it to the concave member of the casting mold;
    b) after adding it to the concave member of the casting mold; or
    c) a combination thereof.

3. The method of claim 1 further comprising at least partially curing the second polymerizable monomer composition:
    a) prior to adding it to the concave member of the casting mold;
    b) after adding it to the concave member of the casting mold; or
    c) a combination thereof.

4. The method of claim 1 wherein each of the first and second polymerizable monomer compositions further comprises an initiating amount of polymerization initiator.

5. The method of claim 4 wherein the polymerization initiator is chosen from thermal initiators, photoinitiators or a mixture thereof.

6. The method of claim 1 further comprising removing the at least essentially cured contact lens from said casting mold.

7. The method of claim 1 further comprising:
    a) at least partially hydrating the at least essentially cured contact lens;
    b) at least partially extracting any unreacted monomer or impurities from the contact lens of a);
    c) at least partially replacing the residual liquid remaining from a) and b) in the contact lens with an isotonic salt solution; and
    d) at least partially eliminating the microbial content from the contact lens of c) and packaging it; or
    e) packaging the contact lens of c) and at least partially eliminating the microbial content.

8. A method for producing a contact lens comprising a photochromic pupillary region comprising:
    a) adding a volume of a first polymerizable monomer composition to a concave member of a casting mold comprising a concave member having a pupillary region and a convex member, said volume being sufficient to produce a pupillary region in an at least essentially cured contact lens;

b) adding a photochromic amount of at least one photochromic material to the first polymerizable monomer composition in the concave member of the casting mold while at least partially curing said first polymerizable monomer composition during the addition of photochromic material;

c) adding a volume of a second polymerizable monomer composition to the concave member of the casting mold, the total volume of the first and second polymerizable monomer compositions being sufficient to produce an at least essentially cured contact lens;

d) affixing the convex member to the concave member of the casting mold;

e) at least essentially curing the polymerizable composition in the casting mold; and f) removing the at least essentially cured contact lens from said casting mold; wherein the extent of photochromic activity in the contact lens body is less than 50 percent of the lens body area.

9. The method of claim 8 further comprising at least partially curing the first polymerizable monomer composition:

a) prior to adding it to the concave member of the casting mold;

b) after adding it to the concave member of the casting mold; or c) a combination thereof.

10. A method for producing a contact lens having a photochromic pupillary region comprising:

a) adding a volume of a first polymerizable monomer composition comprising a photochromic amount of at least one photochromic material to the concave member of a casting mold comprising a concave member having a pupillary region and a convex member, said volume being sufficient to form the pupillary region of an at least essentially cured contact lens;

b) adding a volume of a second polymerizable monomer composition to the concave member of the casting mold using a dispensing means that avoids mixing of said second polymerizable monomer composition with the first polymerizable monomer composition, the total volume of the first and second polymerizable compositions added to said casting mold being sufficient to produce an at least essentially cured contact lens;

c) affixing the convex member to the concave member of the casting mold;

d) at least essentially curing the polymerizable composition in the casting mold; wherein the extent of photochromic activity in the contact lens body is less than 50 percent of the lens body area.

11. The method of claim 10 further comprising at least partially curing the first polymerizable monomer composition:

a) prior to adding it to the concave member of the casting mold;

b) after adding it to the concave member of the casting mold; or c) a combination thereof.

12. The method of claim 10 further comprising the step of at least partially curing the second polymerizable monomer composition:

a) prior to adding it to the concave member of the casting mold;

b) after adding it to the concave member of the casting mold; or c) a combination thereof.

13. The method of claim 10 wherein the viscosity of the first polymerizable monomer composition is at least 300 centipoise higher than the viscosity of the second polymerizable monomer composition.

* * * * *